3,379,739
PRODUCTION OF 2,5-DIARYLAMINO-1,4-BENZO-
QUINONE-3,6-DICARBOXYLIC ACIDS
Rolf Mecke, Ludwigshafen (Rhine), Germany, assignor
to Badische Anilin- & Soda-Fabrik Aktiengesellschaft,
Ludwigshafen (Rhine), Germany
No Drawing. Filed Apr. 3, 1964, Ser. No. 357,260
Claims priority, application Germany, Apr. 24, 1963,
B 71,618; July 19, 1963, B 72,747
3 Claims. (Cl. 260—396)

This invention relates to a new and advantageous process for the production of 2,5-diarylamino-1,4-benzoquinone-3,6-dicarboxylic acids. These dicarboxylic acids may be used for example for the production of linear-trans-quinacridonequinones.

It is known that linear-trans-quinacridonequinones can be obtained by treating 2,5-bis-(2-carboxyanilino)-1,4-benzoquinones with dehydrating agents. Since anthranilic acids are required for the production of the 2,5-bis-(2-carboxyanilino)-1,4-benzoquinones, and since only a few anthranilic acids are commercially available, the said method is very restricted in its application.

According to a method known from German patent specification No. 1,140,300, linear-trans-quinacridonequinones are obtained by cyclinzation of 2,5-diarylamino-1,4-benzoquinone-3,6-dicarboxylic acid dialkyl esters. 2,5-diarylamino-1,4-benzoquinone-3,6-dicarboxylic acid dialkyl esters are obtained by chlorinating 2,5-dihydroxyterephthalic acid dialkyl esters to form 2,5-dichloro-1,4-benzoquinone-3,6-dicarboxylic acid dialkyl esters and reacting these with arylamines.

I have now found that 2,5-diarylamino-1,4-benzoquinone-3,6-dicarboxylic acids having the general formula:

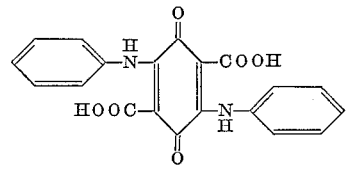

in which the two radicals Ar denote the same aromatic radical, are obtained particularly advantageously by treating 2,5-dihydroxyterephthalic acid with an oxidizing agent in the presence of a primary aromatic amine which is not substituted in one o-position to the amino group.

The new process is advantageously carried out by treating 2,5-dihydroxyterephthalic acid with an oxidizing agent in the presence of a primary aromatic amine which is unsubstituted in one o-position to the amino group and which may bear in the other o-position and also in the m- and p-positions to the amino group, identical or different monovalent radicals and/or attached carbocyclic or heterocyclic rings, in water and/or an organic solvent miscible with water.

In the simple case in which Ar in the above general Formula I stands for a phenyl radical, the reaction according to this invention proceeds in accordance with the following equation:

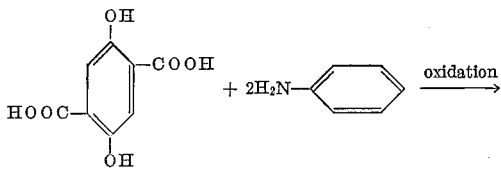

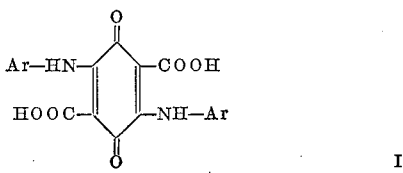

The primary aromatic amines to be used for the process according to this invention are unsubstituted in one o-position to the amino group and may bear identical or different monovalent radicals and/or attached carbocyclic or heterocyclic rings in the other o-position and also in the m- and p-positions to the amino group. Examples of monovalent radicals are halogen atoms, such as fluorine atoms, chlorine atoms or bromine atoms, alkyl groups, such as low molecular weight alkyl groups, aryl groups, such as phenyl groups, naphthyl groups or anthraquinonyl groups, alkoxy groups, aryloxy groups, hydroxyl groups, nitro groups, amino groups, acylamino groups, sulfonamido groups or trifluoromethyl groups. Attached carbocyclic or heterocyclic rings are for example those which give, with the benzene rings of the aromatic amine, the ring system of naphthalene, anthracene, carbazole, diphenylene oxide or diphenylene sulfide. Examples of such amines are aniline, 2-chloroaniline, 3-chloroaniline, 4-chloroaniline, 2,4-dichloroaniline, 4-nitroaniline, 2-toluidine, 3-toluidine, 4-toluidine, 2-anisidine, 3-anisidine, 4-anisidine, xylidine, 4-aminoazobenzene and 4-aminodiphenyl ether. The amines are used in at least stoichiometric amounts with reference to the 2,5-dihydroxyterephthalic acid. It is advantageous to use a slight excess of amine.

Oxidizing agents which are conventionally used for oxidizing hydroquinones to quinones may be used as oxidizing agents for the process according to this invention, such as potassium ferricyanide, ferric chloride, hydrogen peroxide, sodium persulfate, potassium persulfate, ammonium persulfate, sodium bromate, potassium bromate, atmospheric oxygen and preferably sodium chlorate or potassium chlorate. They are used in about stoichiometric amounts. A slight excess is advantageous.

Reaction of 2,5-dihydroxyterephthalic acid with the said amines in the presence of the said oxidizing agents is carried out in water, or in an organic solvent miscible with water, or preferably in a mixture consisting of water and an organic solvent miscible with water, at temperatures of from about 10° to 100° C., preferably 20° to 60° C. In some cases it is advantageous to add to the reaction mixture one of the conventional oxygen carriers, for example a vanadium salt, such as vanadium pentoxide, or a molybdenum salt, in catalytic amounts to accelerate the reaction. To increase the yields it may be advantageous to add weak organic acids, such as acetic acid or propionic acid, to the reaction mixture, particularly when using strongly basic amines. Reaction to form 2,5-diarylamino-1,4-benzoquinone-3,6-dicarboxylic acids proceeds with spontaneous heating up. It is advantageous for the temperature of the reaction mixture to be kept at 40° to 50° C. by cooling. The reaction is over after about one to six hours. The 2,5-diarylamino-1,4-benzoquinone-3,6-dicarboxylic acids separte out during the course of the reaction and may be isolated by simple filtration. They are well crystallized and stable substances having red to brown colors.

It is known that dihydroxyterephthalic acid is very sensitive to oxidation. Moreover it is known that benzoquinone carboxylic acids are very unstable compounds which are difficult to prepare because they readily decompose into benzoquinones free from carboxylic groups by decarboxylation. It is therefore surprising that 2,5-diarylamine-1,4-benzoquinone-3,6-dicarboxylic acids can be obtained in good yields by the process according to this invention.

2,5-diarylamino - 1,4 - benzoquinone - 3,6 - dicarboxylic acids obtainable according to this invention are valuable intermediates for the production of dyes. They are particularly suitable for the production of linear-trans-quinacridonequinones. Cyclization to linear-trans-quinacridonequinones may be achieved for example by allowing cyclizing agents, such as dehydrating agents or halogenating agents, to act on 2,5-diarylamino-1,4-benzoquinone-3,6-dicarboxylic acids, if desired in an organic solvent, and heating any 2,5 - diarylamino - 1,4 - benzoquinone-3,6-dicarboxylic halides formed, preferably in an organic solvent and if desired in the presence of aluminum chloride, at temperatures up to 200° C., preferably up to 150° C.

Examples of dehydrating agents are concentrated sulfuric acid, polyphosphoric acid, phosphorus pentachloride, phosphorus pentoxide or thionyl chloride, and examples of halogenating agents are phosgene, thionyl chloride, thionyl bromide, phosphorus pentachloride, phosphorus pentabromide, phosphorus trichloride, phosphorus oxychloride and oxalyl chloride. The cyclization reaction may be carried out for example by heating the 2,5-diarylamino-1,4-benzoquinone-3,6-dicarboxylic acids in concentrated sulfuric acid to temperatures of about 60° to 100° C. It is also possible however to proceed by treating the 2,5-diarylamino-1,4-benzoquinone-3,6-dicarboxylic acids in an organic solvent, such as benzene, nitrobenzene, chlorobenzene, o-dichlorobenzene, dimethylformamide or pyridine, or in mixtures of these solvents, at about 60° to 150° C. with thionyl chloride or phosgene.

For example if phosgene be used as the halogenating agent and pyridine or a solvent containing pyridine be used as the organic solvent, the corresponding 2,5-diarylamino - 1,4 - benzoquinone-3,6-dicarboxylic acid chlorides are first formed and these are converted into the linear-trans-quinacridonequinones when heated to temperatures up to 200° C., preferably up to 150° C., preferably in one of the said solvents and if desired in the presence of aluminum chloride. It is not necessary to isolate the acid chlorides. On the contrary, the 2,5-diarylamino-1,4-benzoquinone-3,6-dicarboxylic acids may be converted into the acid chlorides in one of the said solvents and the desired linear-trans-quinacridonequinones may be obtained by heating the mixture to 200° C. The linear-trans-quinacridonequinones thus obtainable are yellow to red pigment dyes which are well suited to dyeing plastics, lacquers and as paints and print pastes. If they contain a vattable radical, they may also be used as vat dyes.

The following examples will further illustrate the invention. The parts and percentages given in the examples are units of weight.

EXAMPLE 1

40 parts of 2,5-dihydroxyterephthalic acid, 75 parts of aniline, 53 parts of acetic acid and 0.5 part of ammonium vanadate are introduced into a mixture of 250 parts of methanol and 150 parts of water and the mixture is heated to 50° C. Then a solution of 40 parts of sodium chlorate in 120 parts of water is added during the course of thirty minutes, the temperature being kept at 50° C. by occasional cooling. When the reaction subsides, the mixture is heated for another four hours at 50° C. While still hot, the mixture is suction filtered and the residue is washed with methanol and water. 74.5 parts of 2,5-dianilino-1,4-benzoquinone-3,6-dicarboxylic acid is obtained in the form of red needles which decompose above 200° C. without melting.

The corresponding methyl-substituted 2,5-dianilino-1,4-benzoquinone-3,6-dicarboxylic acids are obtained by using appropriate amounts of p-toluidine or o-toluidine instead of aniline in this example.

EXAMPLE 2

40 parts of 2,5-dihydroxyterephthalic acid, 64 parts of p-chloroaniline, 50 parts of acetic acid and 0.5 part of vanadium pentoxide are introduced into a mixture of 300 parts of ethanol and 100 parts of water and the mixture heated to 50° C. A solution of 40 parts of sodium chlorate in 120 parts of water is then added in the course of thirty minutes and the temperature is kept at 50° C. by cooling. After subsidence of the reaction, the mixture is heated at 50° C. for another two hours. The residue is suction filtered from the hot mixture and washed with methanol and water. 80 parts of 2,5-di-(p-chloroanilino)-1,4-benzoquinone-3,6-dicarboxylic acid is obtained in the form of brown needles which decompose above 200° C. without melting.

2,5-di-(o-chloroanilino) - 1,4 - benzoquinone-3,6-dicarboxylic acid is obtained by replacing the p-chloroaniline in this example by o-chloroaniline.

EXAMPLE 3

40 parts of 2,5-dihydroxyterephthalic acid, 72 parts of 2,4-dichloroaniline and 0.5 part of ammonium vanadate are introduced into a mixture of 600 parts of ethanol and 200 parts of water and the mixture is heated to 50° C. Then a solution of 40 parts of sodium chlorate in 120 parts of water is added and the temperature is kept at 50° C. by cooling. After the reaction has subsided, the mixture is stirred for another two hours at 50° C. The residue is suction filtered and washed with methanol and water, 98 parts of 2,5-di-(2,4-dichloroanilino)-1,4-benzoquinone-3,6-dicarboxylic acid is obtained as dark brown crystals. The same compound is obtained when the sodium chlorate solution is replaced by a solution of 60 parts of potassium bromate in 480 parts of hot water.

EXAMPLE 4

40 parts of 2,5-dihydroxyterephthalic acid and 60 parts of p-nitraniline are added to a solution of 500 parts of ethanol and 100 parts of water and the mixture is heated to 50° C. A solution of 200 parts of anhydrous ferric chloride in 300 parts of water is then allowed to flow in. The mixture is stirred for four hours at 50° C. The residue is suction filtered and washed with methanol and water. 80 parts of 2,5-di-(p-nitroanilino)-1,4-benzoquinone-3,6-dicarboxylic acid is obtained as pale brown needles. A similar result is achieved by replacing the ferric chloride solution in this example by a suspension of 170 parts of potassium persulfate in 500 parts of water.

EXAMPLE 5

20 parts of 2,5-dihydroxyterephthalic acid, 30 parts of p-nitraniline and 0.5 part of ammonium vanadate are suspended in a mixture of 300 parts of methanol and 100 parts of water. A solution of 20 parts of sodium chlorate in 100 parts of water is added, the temperature thus rising to about 45° C. The mixture is stirred for another three hours at 45° to 50° C. The residue is suction filtered and washed with methanol and water. 45 parts of 2,5-di-(p-nitroanilino)-1,4-benzoquinone - 3,6 - dicarboxylic acid is obtained as pale brown needles.

An equivalent amount of 2,5-di-(o-nitroanilino)-1,4-benzoquinone-3,6-dicarboxylic acid is obtained by replacing the p-nitraniline in this example by the same amount of o-nitraniline.

I claim:

1. A process for production of 2,5 - diarylamino - 1,4-benzoquinone - 3,6 - dicarboxylic acids having the general formula:

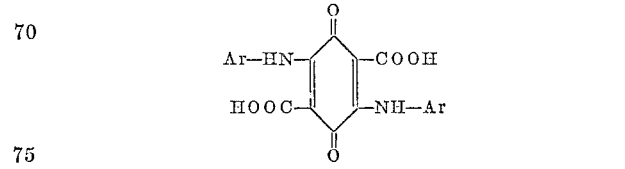

wherein each Ar is the same aromatic radical and constitutes the monovalent radical of an aromatic ring selected from the group consisting of (a) benzene and substituted benzene bearing a substituent from the group consisting of a halogen atom, lower molecular weight alkyl, nitro, methoxy, hydroxy, amino, and trifluoromethyl, said substituted benzene radical being unsubstituted in at least one position ortho to the amino group, which process comprises reacting 2,5-dihydroxyterephthalic acid in a solvent selected from the class consisting of water, organic solvents miscible with water, and mixtures of water and an organic solvent miscible with water in the presence of about a stoichiometric amount of an oxidizing agent selected from the class consisting of potassium ferricyanide, ferric chloride, hydrogen peroxide, sodium persulfate, potassium persulfate, ammonium persulfate, sodium bromate, potassium bromate, sodium chlorate and potassium chlorate with at least a stoichiometric amount of an amine of the formula Ar—$NH_2$ in which Ar has the same meaning as given above at a temperature in the range of 10–100° C.

2. A process as claimed in claim 1 wherein said oxidizing agent is sodium chlorate.

3. A process as claimed in claim 1 wherein said oxidizing agent is potassium chlorate.

References Cited

Harger: Journal American Chemical Society, vol. 46, 1924, pp. 2540–2551.

CHARLES B. PARKER, *Primary Examiner.*

D. PAPUGA, *Assistant Examiner.*